Oct. 12, 1971  H. D. PRUTTON  3,611,462
METHOD OF MAKING HEX HEADED BOLTS AND SCREWS
Filed June 11, 1969

INVENTOR
HOWARD D. PRUTTON
BY
Baldwin, Egan, Walling & Fetzer
ATTORNEYS

United States Patent Office 3,611,462
Patented Oct. 12, 1971

3,611,462
METHOD OF MAKING HEX HEADED BOLTS AND SCREWS
Howard D. Prutton, 46833 Danbridge Road, Plymouth, Mich. 48170
Filed June 11, 1969, Ser. No. 832,178
Int. Cl. B21k 1/44; B23g 9/00
U.S. Cl. 10—27                                    1 Claim

ABSTRACT OF THE DISCLOSURE

A scrapless method is provided for cold forming a hexagon headed fastener such as a cap-screw or bolt, using two blows only, from a cylindrical metal blank having approximately the diameter of the fastener shank, wherein the first blow forms a regular prism of six faces at the head end of the blank having a dimension across diametrically opposed corners approximately equal to said blank diameter, and which at the same time forms a generally frusto-pyramidal portion flaring outwardly from the prism to a dimension slightly greater than the diameter of the blank; and wherein the second blow forms the finished head.

---

This invention relates to the forming of polygon headed fasteners such as bolts or cap-screws and the description will be limited to hexagon headed fasteners, although the features of this invention might be applied to other polygon shapes.

Hexagon headed bolts or cap-screws are presently formed by a two-blow cold forming process wherein the second blow leaves the head in a condition of greater thickness than that desired in the finished form and the upper face of the head must then be trimmed which causes an additional operation and also results in a certain amount of scrap. It is this extra operation and the scrap formed thereby which is eliminated by this invention.

Other scrapless processes of cold forming hexagon head bolts and cap-screws are known which use either three or four blows in an attempt to produce sharp corners on the hexagon head. This is very difficult to do by the process of gathering or upsetting the material of the blank to a larger diameter. This is done by upsetting a cone-shaped part which is subsequently flattened in an attempt to exert enough radial pressure to make the metal fill out the sharp corners required in the head. The present method is an improvement over such multiple blow processes.

It is an object of the present invention, therefore, to take a cylindrical metal blank having approximately the diameter of the desired fastener shank and form the finished fastener, other than the threads, by utilizing two forming blows only. The first blow forms a regular prism having six planar faces at the head end of the fastener and having sharp corners on the prism. This prism has a dimension across the diametrically opposed corners approximately equal to the blank diameter. Below the prism, a generally frusto-pyramidal portion is formed in the same first blow, this portion having six faces also and having corners generally aligned with the corners of the prism but not being extremely sharp corners. This pyramidal portion flares outwardly at an acute angle preferably not over 7½ degrees outwardly from the vertical for a hexagon head. Too great an angle at this point may leave a flash of metal at the bottom of the finished head. A second blow then finishes the desired form, completing the shape of the fastener.

The preferred steps and apparatus are described in the accompanying specification and the essential features are set forth in the appended claim.

In the drawing:

FIG. 6 is an elevational view of the partly formed fastener after the coning punch operation while

Figure 4:
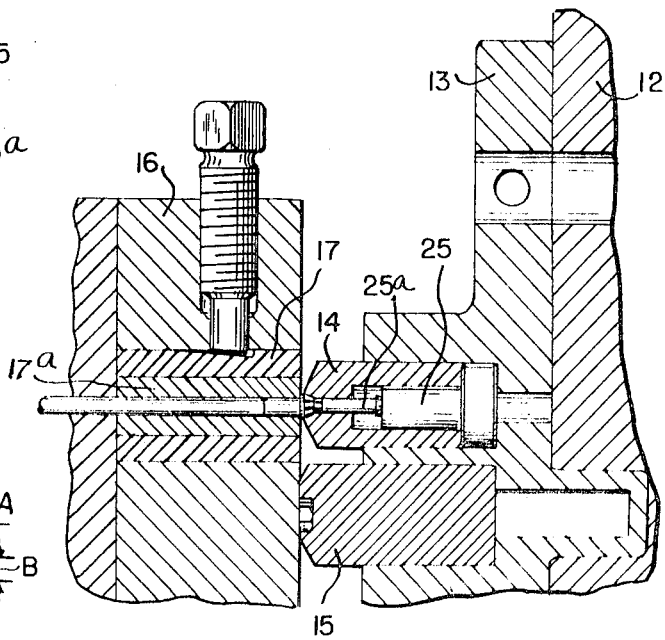
FIG. 4 is a central sectional view through a portion of a cold header machine with the die and coning punch in the position of FIG. 2 and with the finished punch in idle position.
Figure 5:
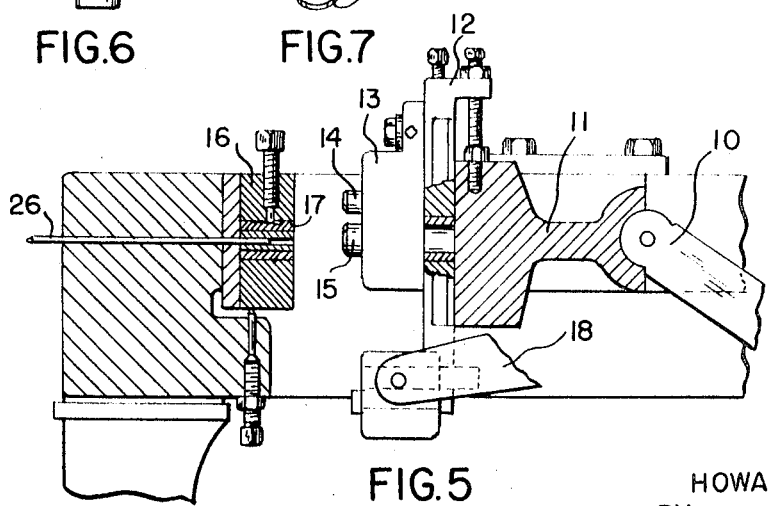
FIG. 5 is a fragmental view showing a larger portion of the cold heading machine utilized in this invention.

It will be understood that this invention might be carried out utilizing various cold heading equipment but the machine shown partially in FIGS. 4 and 5 is a Waterbury Farrel toggle cold header. This is a well known type of machine wherein a rotating crankshaft through an eccentric extends and contracts a pair of toggles, one of which is shown at 10 in FIG. 5. This oscillates a gate 11 horizontally to which is attached a punch slide 12 which carries a punch holder 13 in which are mounted the coning punch 14 and the finished punch 15. The cold header frame supports a die block 16 in which is mounted a die 17 for supporting the work blank in position to be acted upon alternately by the punches 14 and 15. In operation, the punch slide 12 is shifted vertically by a rockshaft 18 which receives its motion from a cam not shown, which is mounted on the same crank shaft which operates the toggles 10. These are well known parts and have no relationship to the present invention except to provide a mechanism for carrying out the operations hereinafter described.

The cylindrical metal blank 19 is of a diameter desired for the finished shank of the fastener. This may be provided in any way desired but quite commonly a pair of intermittently operating feed rolls feed wire of the desired diameter from a coil through a cut-off die to a preset wire stop which acts as a gauge for the cut-off length of wire. A cut-off knife mounted on a cut-off bar moves across the face of the cut-off die and shears off the desired length of wire which then holds the sheared length of wire in position aligned with the opening in die 17 until the gate 11 comes forward and starts the sheared length of wire into the die 17 and coning punch 14, after which the cut-off knife and bar move back out of interfering position.

Figure 1:
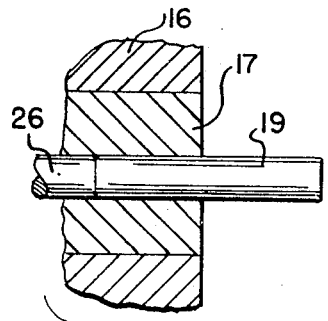
FIG. 1 shows a cylindrical metal blank and a fixed die holder with a first punch in position preliminary to the formation of the prism and frusto-pyramidal portion mentioned above.
Figure 2:
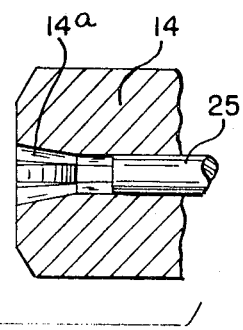
FIG. 2 shows the parts of FIG. 1 in position at the termination of the coning blow.
Figure 2:
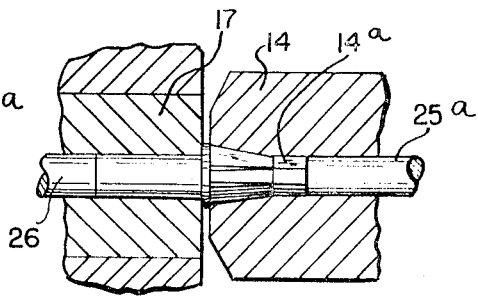
Figure 3:
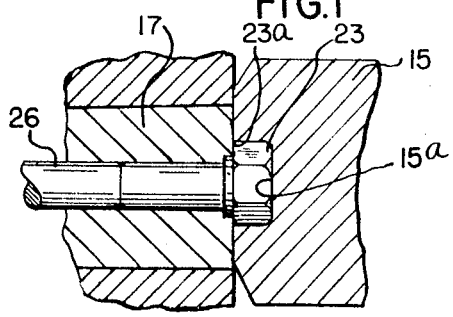
FIG. 3 shows the fastener at the completion of the blow of the finished hammer or punch.
Figure 6:
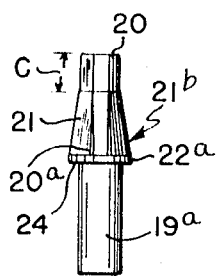
Figure 7:
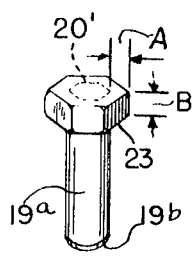
FIG. 7 is a view of the finished fastener slightly tilted to permit an explanation of certain dimensions measured across the fastener head.

The shape of the recess in the coning punch 14 will be best understood by a description of FIG. 6. The coning punch 14 is designed to extrude a regular prism 20 having six faces and having sharp corners. The provision of sharp corners at this phase of the process is necessary if one is to have sharp corners on the finished head utilizing only two blows in the method. The dimension across diametrically opposed corners of the prism is approximately equal to the diameter of the blank 19. Referring to FIG. 7, the form of the top face of prism 20 is indicated at 20' in broken lines. The length C of the prism 20 is approximately equal to the vertical thickness B of the finished head plus ½ of the distance diametrically across the corners of the finished head minus the wire radius. This is indicated by the dimension A in FIG. 7. The dimension C is then preferably the dimension A plus B in order to give a proper fastener. Below the prism 20 in FIG. 6, is a generally frusto-pyramidal portion 21 which has six faces aligned with the prism faces and joined at corners 21a which are not sharp but which give a generally pyramidal structure to the portion 21. The angle of the flaring side 21b relative to the vertical, such as one of the prism faces, is a very small angle, preferably not over 7½ degrees, because too much of an angle at this point will leave a flash at the bottom of the finished head. If a washer face 22 is desired on the underside of the finished head 23, as shown in FIG. 3, then a short cylindrical portion 22a is formed at the bottom of the frusto-pyramidal portion 21. Otherwise, this portion 22a may be omitted.

The bottom of the skirt of the frusto-pyramidal portion 21 is slightly larger in diameter than the blank 19 and, in the case of a hexagonal head measuring ½ inch across the flats overhangs the blank 19 by a dimension 24 which is about 1/32 to 3/64 of an inch. The recess 14a in punch 14 is complementary to the prism and frusto-pyramidal portions of FIG. 6 as above described. The punch 14 supports a back up punch 25 as shown in FIG. 4 which has a projection 25a against which the end of blank 19 rests during the delivery of the first blow in this method.

For the second or finish blow, the punch 15 is provided with a recess 15a which is approximately exactly complementary to the finished head 23 which is desired. The depth of this recess 15a should be a very minute amount less than the overall height B of the finished head so that any irregularities in the length of blank cut-off as previously described will appear as a slight radius 23a on the lower side of the head.

During both the first and second blow of this process, the blank 19 is backed up by a knockout pin 26 which is utilized to push the finished fastener out of the die 17 in the customary manner.

The operation of the machine in carrying out this novel method should now be readily understood. The blank 19 is properly positioned in the die 17 and the gate 11 is brought forward by the straightening of toggles 10 in position to cause the punch 14 to carry out the above described coning blow to shape the blank to the form shown in FIG. 6. The arm 18 then causes the punch slide 12 and punch holder 13 to move upwardly so as to carry the punch 14 to the position of FIG. 5 and to position the finished punch 15 in the position shown there directly opposite the die 17. The finishing blow is then delivered as shown in FIG. 3 flattening the material in the prism 20 and the frusto-pyramidal portion 21 to the shape of the finished head 23 as shown in FIG. 7. At the same time, the shank 19a may be pointed as indicated at 19b in FIG. 7 by proper shaping of the die 17.

Threads may then be rolled on the shank 19a by commonly known processes and of course this results in no scrap formation.

In a hexagon headed fastener measuring ½ inch across the flats, the dimension across the finished corners of the hexagon is 0.577 inch. One-half of this is 0.2885 inch. The diameter of the blank 19 is 0.276 inch. One-half of this is 0.1335 inch which is the dimension from the center of the head 23 in FIG. 7 to the corner of the dotted hexagon where the dimension A begins. Thus, the dimension A is 0.2885 inch minus 0.1335 inch or 0.155 inch. The thickness B of the finished head is between 0.195 inch and 0.211 inch or an average of 0.2030 inch. Therefore, the dimension C in FIG. 6 is 0.1550 inch plus 0.2030 inch or 0.358 inch. It is clear that the volume of metal in the portions 20 and 21 of FIG. 6 is equal to the volume in the finished head 23 of FIG. 7.

I claim:

1. The scrapless method of forming a hexagon headed fastener such as a bolt or cap-screw from a cylindrical metal blank having approximately the diameter of the fastener shank utilizing two forming blows only, comprising forming in a first blow a regular prism having sharp corners and having six planar faces at the head end of the fastener, said prism having a dimension across the corners approximately equal to said wire diameter and having a length approximately equal to the vertical thickness of the finished head plus one-half the distance diametrically across the corners of the finished head minus the radius of the cylindrical blank, and forming in the same blow a generally frusto-pyramidal portion having six faces and having its corners generally aligned with the corners of said prism, said generally pyramidal portion flaring outwardly away from the inner end of said prism at an angle to the associated prism faces not substantially greater than seven and one-half degrees for said hexagon fastener head to a diameter greater than the wire such that said pyramidal portion and said prism provide a volume of metal approximately equal to the volume of the finished head, and forming in a second blow the finished hexagon head of said fastener.

References Cited

UNITED STATES PATENTS

| | | | |
|---|---|---|---|
| 7,167 | 6/1876 | Clark | 10—27 |
| 376,673 | 1/1888 | Mutimer | 10—27 |
| 2,202,324 | 5/1940 | Tomalis | 10—19 |
| 2,799,027 | 7/1957 | Hatebur | 10—27 |
| 3,253,287 | 5/1966 | Friedman | 10—27 |
| 3,461,470 | 8/1969 | Cochrum | 10—27 |

OTHER REFERENCES

American Machinist, Apr. 8, 1948, pp. 100, 104, 109, 110.

CHARLES W. LANHAM, Primary Examiner

E. M. COMBS, Assistant Examiner